United States Patent
Sasaki et al.

(10) Patent No.: US 8,498,191 B2
(45) Date of Patent: Jul. 30, 2013

(54) INFORMATION RECORDING / REPRODUCING METHOD AND APPARATUS, AND INFORMATION REPRODUCING APPARATUS

(75) Inventors: Yoshio Sasaki, Tokorozawa (JP); Yasushi Oshima, Adachi (JP)

(73) Assignee: Pioneer Digital Design and Manufacturing Corporation, Kanagawa (JP)

( * ) Notice: Subject to any disclaimer, the term of this patent is extended or adjusted under 35 U.S.C. 154(b) by 0 days.

(21) Appl. No.: 13/808,497

(22) PCT Filed: Jul. 15, 2010

(86) PCT No.: PCT/JP2010/061994
§ 371 (c)(1), (2), (4) Date: Jan. 4, 2013

(87) PCT Pub. No.: WO2012/008036
PCT Pub. Date: Jan. 19, 2012

(65) Prior Publication Data
US 2013/0107686 A1    May 2, 2013

(51) Int. Cl.
*G11B 7/00* (2006.01)
(52) U.S. Cl.
USPC .............. 369/275.3; 369/13.26; 369/47.5
(58) Field of Classification Search
None
See application file for complete search history.

(56) References Cited

U.S. PATENT DOCUMENTS

| | | | |
|---|---|---|---|
| 6,584,566 B1 | 6/2003 | Hardjono | |
| 6,813,714 B1 | 11/2004 | Hardjono et al. | |
| 6,940,794 B2 | 9/2005 | Hayashi | |
| 7,945,272 B2 | 5/2011 | Kim | |
| 2002/0021656 A1* | 2/2002 | Tsukagoshi et al. | 369/275.3 |
| 2003/0044020 A1 | 3/2003 | Aboba et al. | |
| 2003/0177267 A1 | 9/2003 | Orava et al. | |
| 2006/0063548 A1 | 3/2006 | Kim | |
| 2006/0187786 A1 | 8/2006 | Torii | |
| 2007/0071021 A1 | 3/2007 | Girao | |

FOREIGN PATENT DOCUMENTS

| | | |
|---|---|---|
| JP | 2003-030830 | 1/2003 |
| JP | 2003-115109 | 4/2003 |
| JP | 2006-081184 | 3/2006 |
| JP | 2006-236469 | 9/2006 |
| JP | 2007-089156 | 4/2007 |
| JP | 2007-265596 | 10/2007 |

(Continued)

OTHER PUBLICATIONS

International Search Report, PCT/JP2010/061994, Oct. 12, 2010.

*Primary Examiner* — Van Chow
(74) *Attorney, Agent, or Firm* — Young & Thompson

(57) ABSTRACT

An information recording/reproducing method includes: setting light beam power from a light source, to second power P2, which is weaker than first power P1, and detecting the number of the recording layers provided for an optical disc; controlling an objective lens to focus the light beam on one recording layer which is the closest to the objective lens, in a condition that the detected number of the recording layers $\geq 3$; setting the power of the light beam to third power P3, between P1 and P2; specifying the number of the recording layers provided for the optical disc on the basis of layer information, which is information associated with the one recording layer; and setting the power of the light beam to P1, reading the layer type information recorded in advance in the one recording layer, and specifying a disc type based on the read layer type information.

7 Claims, 4 Drawing Sheets

FOREIGN PATENT DOCUMENTS

| | | |
|---|---|---|
| JP | 2008-204536 | 9/2008 |
| JP | 2008-257340 | 10/2008 |
| JP | 2008-543137 | 11/2008 |
| JP | 2010-160864 | 7/2010 |
| WO | WO 2007/072814 | 6/2007 |

* cited by examiner

INFORMATION RECORDING / REPRODUCING METHOD AND APPARATUS, AND INFORMATION REPRODUCING APPARATUS

TECHNICAL FIELD

The present invention relates to an information recording/reproducing method and apparatus for recording information onto an optical disc, such as, for example, a Blu-ray disc (BD), or for reproducing the recorded information, and an information reproducing apparatus, and particularly relates to judgment or determination of the type or the like of the optical disc which is a recording or reproduction target.

BACKGROUND ART

As this type of method, for example, there has been suggested a method of reading address information recorded on an optical disc and obtaining information about the number of layers on a recording surface of the optical disc on the basis of the read address information in cases where the optical disc is inserted to an optical disc apparatus (refer to patent documents 1). Alternatively, there has been suggested a method of detecting S-shaped waveforms on the basis of electrical signals according to reflected light from the optical disc and judging or determining the number of layers of the optical disc on the basis of the detected S-shaped waveforms (refer to patent document 2).

Prior Art Document

Patent Document
Patent document 1: Japanese Patent Application Laid Open No. 2003-30830
Patent document 2: Japanese Patent Application Laid Open No. 2008-204536

DISCLOSURE OF INVENTION

Subject to be Solved by the Invention

In the aforementioned background art, however, when the type or the like of the optical disc is determined, power of a light beam irradiated on the optical disc is not considered. There is such a technical problem that the information recorded on the optical disc may be deteriorated depending on the power of the light beam.

In view of the aforementioned problem, it is therefore an object of the present invention to provide an information recording/reproducing method and apparatus and an information reproducing apparatus which can judge or determine the type or the like of the optical disc while suppressing the deterioration of the information recorded on the optical disc.
Means for Solving the Subject In order to solve the above-mentioned object, the information recording/reproducing method of the present invention is an information recording/reproducing method in an information recording/reproducing apparatus for recording information onto an optical disc or reproducing the recorded information by focusing a light beam emitted from a light source on the optical disc via an objective lens, the optical disc having a plurality of recording layers, layer type information indicating a type of each of the recording layers being recorded in advance in the each recording layer, said information recording/reproducing method is provided with a number-of-layer detecting process of setting power of the light beam emitted from the light source, to second power, which is weaker than first power as one power, and detecting the number of the recording layers provided for the optical disc; a lens controlling process of controlling the objective lens to focus the light beam emitted from the light source on one recording layer which is the closest to the objective lens out of the plurality of recording layers, in a condition that the detected number of the recording layers is greater than or equal to three; a power setting process of setting the power of the light beam emitted from the light source to third power, which is between the first power and the second power, after said lens controlling process; a number-of-layer specifying process of specifying the number of the recording layers provided for the optical disc on the basis of layer information, which is information associated with the one recording layer; and a type specifying process of setting the power of the light beam emitted from the light source to the first power after said number-of-layer specifying process, reading the layer type information recorded in advance in the one recording layer, and specifying a type of the optical disc on the basis of the read layer type information.

According to the information recording/reproducing method of the present invention, the information recording/reproducing method is an information recording/reproducing method in the information recording/reproducing apparatus for recording information onto the optical disc or reproducing the recorded information by focusing the light beam emitted from the light source, such as, for example, a laser diode (LD), on the optical disc via the objective lens.

The optical disc targeted by the information recording/reproducing method has the plurality of recording layers. The layer type information indicating the type of each of the recording layers is recorded in advance in the each recording layer. Here, the "type" means a type determined by a predetermined standard, such as, for example, a Blu-ray disc recordable (BD-R) and a Blu-ray disc rewritable (BD-RE). Incidentally, on the optical disc, not only the layer type information but also configuration information indicating a configuration of the optical disc or the like may be recorded in advance.

In the number-of-layer detecting process, the power of the light beam emitted from the light source is set to the second power, which is weaker than the first power as one power, and the number of the recording layers provided for the optical disc is detected. Here, a known technology or technique, such as, for example, a focus search, can be applied to detect the number of the recording layers.

The "first power" of the present invention is, for example, 1.0 mW (milliwatt) or the like, and is set as relatively weak power (i.e. which does not deteriorate the information recorded on the optical disc), out of power with which the information recorded on the optical disc having three or more recording layers can be certainly read. On the other hand, the "second power" of the present invention is weaker than the first power, and is, for example, 0.35 mW or the like. The "second power" may be set as power which does not deteriorate the information recorded on the optical disc having only one recording layer (i.e. a single-layer optical disc).

According to the study of the present inventors, the following has been found; namely, under the assumption that the power of the light beam emitted from the light source is constant, if the number of the recording layers provided for the optical disc is increased, quantity of reflected light from the recording layer which is a recording or reproduction target is weakened due to the number of the recording layers. Therefore, in order to keep the quantity of the reflected light in a predetermined range, it is necessary to increase the power of the light beam in accordance with the number of the recording layers.

On the other hand, each number of the recording layers provided for the optical disc has its own preferable power of the light beam. Specifically, for example, in the case of the BD, it is 0.35 mW (one layer), 0.7 mW (double layer), 1.0 mW (triple layer), 1.1 mW (quadruple layer), and the like. If the light beam having power stronger than the preferable power described above is irradiated on the optical disc, the information recorded on the optical disc (recording layer) is possibly deteriorated.

Thus, in the present invention, in the number-of-layer detecting process in which the number of the recording layers provided for the optical disc is unknown, the number of the recording layers provided for the optical disc is detected by using the light beam having the second power which is sufficiently weak. Thus, it is possible to suppress the deterioration of the information recorded on the optical disc.

If the number of the recording layers detected in the number-of-layer detecting process is greater than or equal to three, the objective lens is controlled to focus the light beam emitted from the light source, on the one recording layer which is the closest to the objective lens out of the plurality of recording layers (i.e. the recording layer located on the front or nearest side viewed from the objective lens), in the lens controlling process.

In the power setting process, the power of the light beam emitted from the light source is set to the third power, which is between the first power and the second power. This increases the quantity of the reflected light and improves readability.

However, if the number of the recording layers of the optical disc is increased, a layer thickness between the recording layers is reduced, and accuracy of detecting the number of the recording layers in the number-of-layer detecting process is reduced. Specifically, for example, even if the optical disc has two recording layers, it is sometimes detected that the number of the recording layers is three. Thus, in the present invention, as described above, by setting the power of the light beam to the third power (e.g. 0.7 mW, etc.), which is between the first power and the second power, the readability is improved while the deterioration of the information recorded on the optical disc is suppressed even if the number of the recording layers is erroneously detected.

Incidentally, "after the lens controlling process" means "after an end time point of the lens processing process", and is not limited to immediately after the lens controlling process.

In the number-of-layer specifying process, the number of the recording layers provided for the optical disc is specified on the basis of the layer information, which is information associated with the one recording layer. Thus, it is possible to specify the number of the recording layers provided for the optical disc with higher accuracy than the detection accuracy in the number-of-layer detecting process.

In a multilayer optical disc, out of the plurality of recording layers, the recording layer located on the rear or farthest side viewed from the objective lens is set as a zero layer (i.e. "Layer 0: L0"), and the recording layer closer to the objective lens has a larger number assigned to the layer. Thus, if it is possible to read the layer information, which is the information associated with the one recording layer located on the nearest side to the objective lens out of the plurality of recording layers, then, it is possible to specify how many recording layers the optical disc has, relatively easily. Incidentally, the "layer information" is, for example, an address in pre-groove (ADIP) address, a linear velocity in which frequency of a wobble signal is predetermined frequency, or the like.

In the type specifying process, the power of the light beam emitted from the light source is set to the first power, the layer type information recorded in advance in the one recording layer is read, and the type of the optical disc is specified on the basis of the read layer type information. Here, the "layer type information" is, for example, a "BD Layer Type Identifier" of disc information (DI) of the ADIP, or the like.

The type specifying process is performed only when it is specified that the optical disc has three or more recording layers in the number-of-layer specifying process. Thus, even if the power of the light beam is set to the first power, it is possible to suppress the deterioration of the information recorded on the optical disc. Moreover, setting the power of the light beam to the first power makes it possible to improve the readability.

Incidentally, "after the number-of-layer specifying process" means "after an end time point of the number-of-layer specifying process", and is not limited to immediately after the number-of-layer specifying process.

As a result, according to the information recording/reproducing method of the present invention, it is possible to judge or determine the type of the optical disc, or the like, while suppressing the deterioration of the information recorded on the optical disc.

Incidentally, on the information recording/reproducing apparatus to which the information recording/reproducing method described above is applied, after the type specifying process described above, for example, a "BD structure" of the DI of the ADIP recorded in advance on the optical disc, or the like is read, and the number of the recording layers provided for the optical disc and the power of the light beam to be irradiated on each recording layer are determined on the basis of the read "BD structure".

In one aspect of the information recording/reproducing method of the present invention, the layer information is address information associated with the one recording layer.

According to this aspect, it is possible to specify the number of the recording layers provided for the optical disc, relatively easily.

In the aspect where the layer information is address information, the information recording/reproducing method may be further provided with a judging process of judging whether or not the layer information can be read by using the light beam having the second power after said lens controlling process and before said number-of-layer specifying process, if it is judged that the layer information can be read, said number-of-layer specifying process being performed, and if it is judged that the layer information cannot be read, said number-of-layer specifying process being performed after said power setting process.

By virtue of such a configuration, if the layer information can be read by using the light beam having the second power, the power setting process is not performed, and it is thus possible to reduce a processing time associated with the information recording/reproducing method.

In other aspect of the information recording/reproducing method of the present invention, the layer information is a linear velocity in which frequency of a wobble signal associated with the one recording layer is predetermined frequency.

According to this aspect, it is possible to specify the number of the recording layers provided for the optical disc, relatively easily. In particular, the linear velocity can be read more easily than address information, such as, for example, the ADIP address. It is thus possible to improve accuracy of specifying the number of the recording layers, in comparison with cases where the address information is read.

In other aspect of the information recording/reproducing method of the present invention, configuration information indicating a configuration of the optical disc is recorded in advance on the optical disc, and said information recording/reproducing method further comprises a determining process of reading the configuration information after said type specifying process, determining the number of the recording layers on the basis of the read configuration information, and determining the power of the light beam to irradiate on each of the plurality of recording layers.

According to this aspect, after the type specifying process, in the determining process, the configuration information, such as, for example, the "BD structure" of the DI of the ADIP, recorded in advance on the optical disc is read, and the number of the recording layers is determined on the basis of the read configuration information, and the power of the light beam to be irradiated on each of the plurality of recording layers is determined. This makes it possible to appropriately record the information onto the optical disc, or to appropriately reproduce the recorded information.

In order to solve the above-mentioned object, the information recording/reproducing apparatus of the present invention is an information recording/reproducing apparatus for recording information onto an optical disc or reproducing the recorded information, the optical disc having a plurality of recording layers, layer type information indicating a type of each of the recording layers being recorded in advance in the each recording layer, said information recording/reproducing apparatus is provide with a light source; a power setting device capable of setting power of a light beam emitted from the light source; an objective lens for focusing the light beam emitted from the light source on the optical disc; a lens driving device capable of driving the objective lens such that the light beam emitted from the light source is focused on a recording layer which is a recording or reproduction target out of the plurality of recording layers; a controlling device for controlling each of said power setting device and said lens driving device; and a number-of-layer detecting device for detecting the number of the recording layers provided for the optical disc, said controlling device controlling said power setting device to set the power of the light beam emitted from the light source to second power, which is weaker than first power as one power, when said number-of-layer detecting device detects the number of the recording layers, controlling said lens driving device such that the light beam emitted from the light source is focused on one recording layer which is the closest to the objective lens out of the plurality of recording layers, in a condition that the number of the recording layers detected by said number-of-layer detecting device is greater than or equal to three, and controlling said power setting device to set the power of the light beam emitted from the light source to third power, which is between the first power and the second power, after the light beam emitted from the light source is focused on the one recording layer, said information recording/reproducing apparatus is further provide with a number-of-layer specifying device for specifying the number of the recording layers provided for the optical disc on the basis of layer information, which is information associated with the one recording layer; and a type specifying device for reading the layer type information recorded in advance in the one recording layer and specifying a type of the optical disc on the basis of the read layer type information, said controlling device controlling said power setting device to set the power of the light beam emitted from the light source to the first power when said type specifying device specifies the type.

According to the information recording/reproducing apparatus of the present invention, as in the information recording/reproducing method of the present invention described above, it is possible to judge or determine the type of the optical disc, or the like, while suppressing the deterioration of the information recorded on the optical disc. Incidentally, the information recording/reproducing apparatus of the present invention can adopt the same various aspects as those of the information recording/reproducing method of the present invention described above.

In order to solve the above-mentioned object, the information reproducing apparatus of the present invention is an information reproducing apparatus for reproducing information recorded on an optical disc having a plurality of recording layers, layer type information indicating a type of each of the recording layers being recorded in advance in the each recording layer, said information reproducing apparatus is provided with a light source; a power setting device capable of setting power of a light beam emitted from the light source; an objective lens for focusing the light beam emitted from the light source on the optical disc; a lens driving device capable of driving the objective lens such that the light beam emitted from the light source is focused on a recording layer which is a reproduction target out of the plurality of recording layers; a controlling device for controlling each of said power setting device and said lens driving device; and a number-of-layer detecting device for detecting the number of the recording layers provided for the optical disc, said controlling device controlling said power setting device to set the power of the light beam emitted from the light source to second power, which is weaker than first power as one power, when said number-of-layer detecting device detects the number of the recording layers, controlling said lens driving device such that the light beam emitted from the light source is focused on one recording layer which is the closest to the objective lens out of the plurality of recording layers, in a condition that the number of the recording layers detected by said number-of-layer detecting device is greater than or equal to three, and controlling said power setting device to set the power of the light beam emitted from the light source to third power, which is between the first power and the second power, after the light beam emitted from the light source is focused on the one recording layer, said information reproducing apparatus is further provided with a number-of-layer specifying device for specifying the number of the recording layers provided for the optical disc on the basis of layer information, which is information associated with the one recording layer; and a type specifying device for reading the layer type information recorded in advance in the one recording layer and specifying a type of the optical disc on the basis of the read layer type information, said controlling device controlling said power setting device to set the power of the light beam emitted from the light source to the first power when said type specifying device specifies the type.

According to the information reproducing apparatus of the present invention, as in the information recording/reproducing method of the present invention described above, it is possible to judge or determine the type of the optical disc, or the like, while suppressing the deterioration of the information recorded on the optical disc. Incidentally, the information reproducing apparatus of the present invention can adopt the same various aspects as those of the information recording/reproducing method of the present invention described above.

The operation and other advantages of the present invention will become more apparent from embodiments explained below.

MODE FOR CARRYING OUT THE INVENTION

Hereinafter, embodiments of the information recording/reproducing method and apparatus of the present invention will be explained with reference to the drawings.

<First Embodiment>

A first embodiment of the information recording/reproducing method and apparatus of the present invention will be explained with reference to FIG. 1 to FIG. 3. Incidentally, in the first embodiment, a Blu-ray disc is exemplified as the "optical disc" of the present invention; however, the optical disc of the present invention is not limited to this example.

The information recording/reproducing apparatus in the first embodiment will be explained with reference to FIG. 1. FIG. 1 is a block diagram illustrating a configuration of the information recording/reproducing apparatus in the first embodiment. Incidentally, FIG. 1 illustrates only members which are directly related to the first embodiment and omits the illustration of other member.

Figure 1:
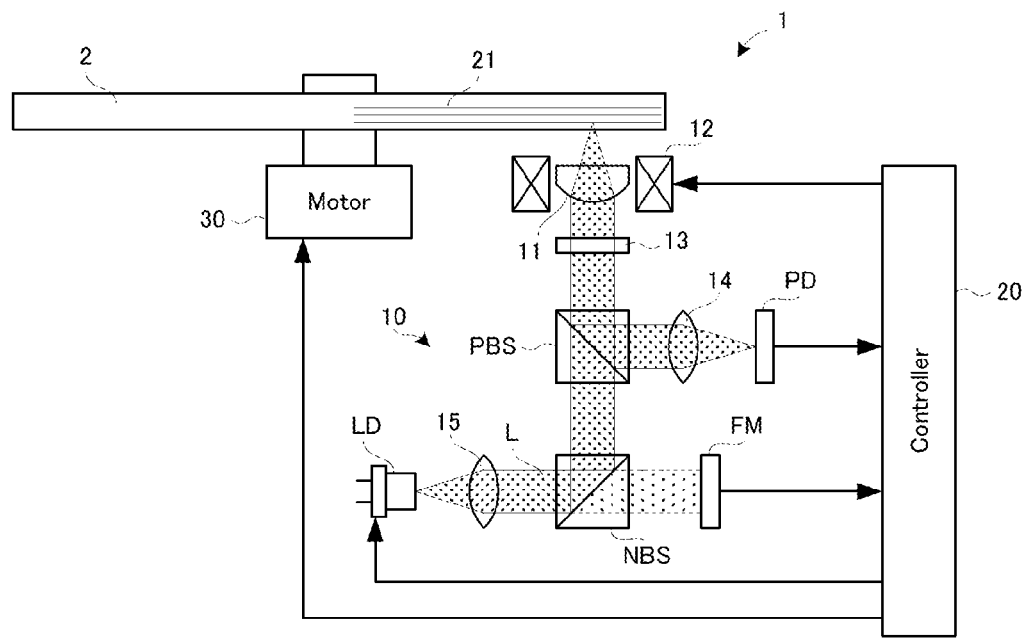
FIG. 1 is a block diagram illustrating a configuration of an information recording/reproducing apparatus in a first embodiment of the present invention.

In FIG. 1, an information recording/reproducing apparatus 1 is provided with an optical pickup 10, a controller 20, and a spindle motor 30. The spindle motor 30 has a turntable (not illustrated) for detachably and rotatably holding a Blu-ray disc 2 (hereinafter referred to as a "BD2").

The optical pickup 10 is provided with an objective lens 11, a lens actuator 12 capable of driving the objective lens 11, a quarter wave plate 13, lenses 14 and 15, a light source LD, such as, for example, a blue laser diode, a photodetector or light receiving element PD, a front monitor FM, a non-polarization beam splitter NBS, and a polarization beam splitter PBS.

In the optical pickup 10, a light beam L emitted from the light source LD and having a wavelength of, for example, 405 nanometers (nm) enters the non-polarization beam splitter NBS via the lens 15. The light beam L is reflected on a reflective surface of the non-polarization beam splitter NBS, and an optical path of the light beam L is bent in a BD2 direction by 90 degrees. Incidentally, one portion of the light beam L entering the non-polarization beam splitter NBS is transmitted through the non-polarization beam splitter NBS and enters the front monitor FM.

The light beam L reflected by the non-polarization beam splitter NBS is transmitted through the quarter wave plate 13 via the polarization beam splitter PBS and becomes circularly-polarized light. The light beam L transmitted through the quarter wave plate 13 is focused on one recording layer which is a recording or reproduction target, out of a plurality of recording layers 21 of the BD2, by the objective lens 11.

The light beam L reflected by the one recording layer is transmitted through the quarter wave plate 13 via the objective lens 11 and thus becomes linearly polarized light in which a polarization direction is rotated by 90 degrees with respect to incident light. The light beam L is reflected on a reflective surface of the polarization beam splitter PBS and is focused on the photodetector PD via the lens 14.

The controller 20 generates, for example, a tracking error signal and a focus error signal on the basis of a signal outputted from the photodetector PD, and controls the lens actuator 12 on the basis of the generated tracking error signal and the generated focus error signal. The controller 20 also controls the spindle motor 30 on the basis of the signal outputted from the photodetector PD. The controller 20 also controls the light source LD such that the power of the light beam L is predetermined power, on the basis of a signal outputted from the front monitor FM.

Here, a configuration of the BD2 will be explained with reference to FIG. 2. FIG. 2 is a cross sectional view illustrating one example of a cross section of a Blu-ray disc. Incidentally, in FIG. 2, a Blu-ray disc for recording with three or four recording layers is exemplified as the Blu-ray disc. The light beam L emitted from the light source LD enters the Blu-ray disc from the side of a cover layer in the drawing.

A triple-layer (TL) Blu-ray disc having three recording layers, as illustrated in FIG. 2(a), has a recording layer L0, a recording layer L1, and a recording layer L2 laminated in this order from the rear or farthest side to the front or nearest side viewed from the cover layer side. Distances from a cover layer surface to the recording layers L0, L1, and L2 are 57 μm, 75 μm, and 100 μm, respectively.

On the other hand, a quadruple-layer (QL) Blu-ray disc having four recording layers, as illustrated in FIG. 2(b), has a recording layer L0, a recording layer L1, a recording layer L2, and a recording layer L3 laminated in this order from the rear side to the front side viewed from the cover layer side. Distances from a cover layer surface to the recording layers L0, L1, L2, and L3 are 53.5 μm, 65 μm, 84.5 μm, and 100 μm, respectively.

Next, disc determination processing in the first embodiment will be explained with reference to a flowchart in FIG. 3. The disc determination processing is performed when the optical disc is inserted to the information recording/reproducing apparatus 1.

Figure 3:
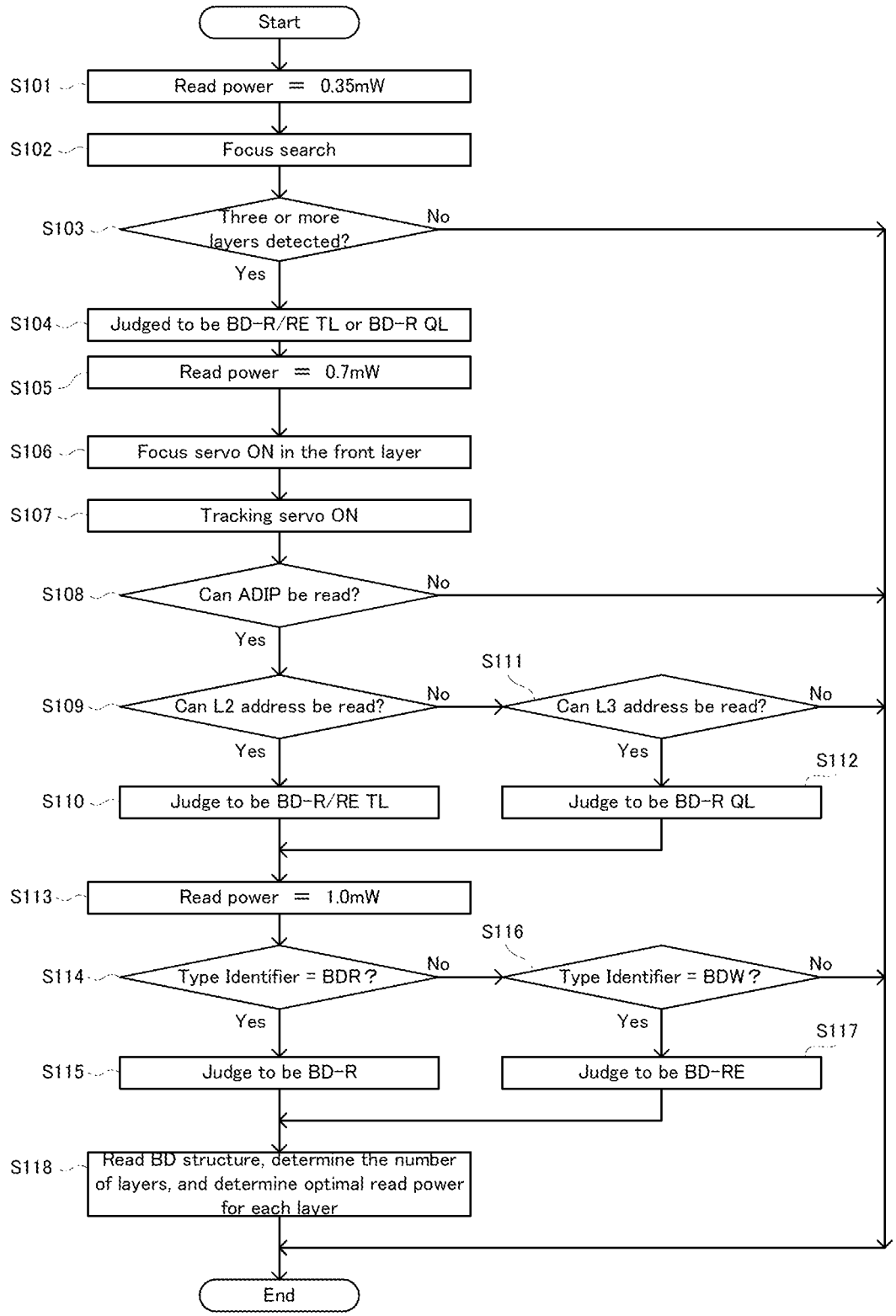
FIG. 3 is a flowchart illustrating disc determination processing in the first embodiment of the present invention.

In FIG. 3, firstly, the controller 20 controls the light source LD to emit, for example, the light beam having power of 0.35 mW (step S101) and performs a known focus search while controlling the lens actuator 12 (step S102).

Incidentally, 0.35 mW is an optimal value for the reproduction of a Blu-ray disc having only one recording layer (i.e. an optimal read power). Here, the "optimal read power" is a maximum value of power which does not deteriorate information recorded on the optical disc, out of the power of the light beam irradiated on the optical disc, when the information recorded on the optical disc is reproduced.

At a time point at which the optical disc is inserted to the information recording/reproducing apparatus 1, the information recording/reproducing apparatus 1 does not recognize how many recording layers the inserted optical disc has, or the like. Thus, as described above, by performing the focus search with the light beam having relatively weak power such as, for example, 0.35 mW, it is possible to avoid that the information recorded on the inserted optical disc is deteriorated due to the focus search even if the optical disc inserted to the information recording/reproducing apparatus 1 has only one recording layer.

Then, the controller 20 judges whether or not three or more recording layers are detected by the focus search (step S103). If it is judged that the three or more recording layers are not detected (the step S103: No), the controller 20 ends the processing.

On the other hand, if it is judged that the three or more recording layers are detected (the step S103: Yes), the controller 20 judges that the optical disc inserted to the information recording/reproducing apparatus 1 is a triple-layer BD-R or BD-RE having three recording layers, or a quadruple-layer BD-R having four recording layers (step S104).

Then, the controller 20 controls the light source LD to irradiate, for example, the light beam having power of 0.7 mW (step S105). Then, the controller 20 performs focus servo (step S106) and performs tracking servo (step S107) in the recording layer which is the closest to the objective lens 11 (i.e. which is located on the front or nearest side viewed from the cover layer side of the optical disc), out of the recording layers provided for the inserted optical disc, on the basis of the signal outputted from the photodetector PD.

Figure 2:
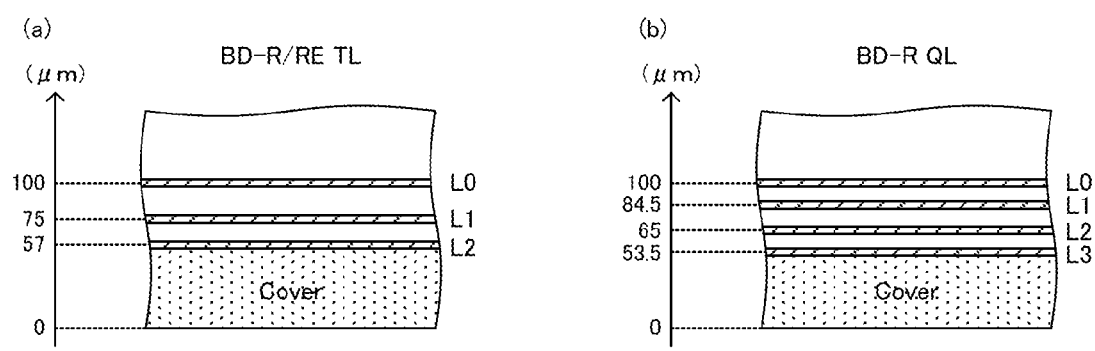
FIG. 2 is a cross sectional view illustrating one example of a cross section of a Blu-ray disc.

If the Blu-ray disc has many recording layers, as illustrated in FIG. 2, a layer thickness between the recording layers is reduced, and accuracy of detecting the number of the recording layers in the focus search is reduced. In the processing in the step S103 described above, even if the inserted optical disc has only two recording layers, it is possibly judged that three or more recording layers are detected.

Thus, by setting the power of the light beam emitted from the light source LD to be weaker than, for example, the optimal read power (e.g. 1.0 mW) associated with the Blu-ray disc having three recording layers, even if the number of the recording layers is erroneously detected, it is possible to avoid the deterioration of the information recorded on the optical disc. Incidentally, 0.7 mW is the optimal read power associated with the Blu-ray disc having two recording layers.

Then, the controller 20 judges whether or not an ADIP can be read (step S108). If it is judged that the ADIP cannot be read (the step S108: No), the controller 20 ends the processing.

On the other hand, if it is judged that the ADIP can be read (the step S108: Yes), the controller 20 judges whether or not the read ADIP address corresponds to an address associated with the recording layer L2 (step S109). If it is judged that the read ADIP address corresponds to the address associated with the recording layer L2 (the step S109: Yes), the controller 20 judges that the inserted optical disc is the triple-layer BD-R or BD-RE having three recording layers (step S110).

On the other hand, if it is judged that the read ADIP address does not correspond to the address associated with the recording layer L2 (the step S109: No), the controller 20 judges whether or not the read ADIP address corresponds to an address associated with the recording layer L3 (step S111). If the read ADIP address corresponds to the address associated with the recording layer L3 (the step S111: Yes), the controller 20 judges that the inserted optical disc is the quadruple-layer BD-R having four recording layers (step S112).

On the other hand, if the read ADIP address does not correspond to the address associated with the recording layer L3 (the step S111: No), the controller 20 ends the processing. Incidentally, in cases where there is an optical disc having five or more recording layers, if it is judged in the processing in the step S111 described above that the read ADIP address does not correspond to the address associated with the recording layer L3, the controller 20 may be configured, for example, to judge whether or not the read ADIP address corresponds to an address associated with the recording layer L4.

After the processing in the step S110 or step S112 described above, the controller 20 controls the light source LD to irradiate, for example, the light beam having power of 1.0 mW (step S113). Incidentally, 1.0 mW is the optimal read power associated with the recording layer L2 of the BD-RE having three recording layers.

Then, the controller 20 reads "BD Layer Type Identifier" of DI of the ADIP, and judges whether or not the read "BD Layer Type Identifier" is "BDR" (step S114). If it is judged that the read "BD Layer Type Identifier" is "BDR" (the step S114: Yes), the controller 20 judges that the inserted optical disc is the BD-R (step S115).

On the other hand, if it is judged that the read "BD Layer Type Identifier" is not "BDR" (the step S114: No), the controller 20 judges whether or not the read "BD Layer Type Identifier" is "BDW" (step S116).

If it is judged that the read "BD Layer Type Identifier" is "BDW" (the step S116: Yes), the controller 20 judges that the inserted optical disc is the BD-RE (step S117). On the other hand, if it is judged that the read "BD Layer Type Identifier" is not "BDW" (the step S116: No), the controller 20 ends the processing.

After the step S115 or S117 described above, the controller 20 reads a "BD structure" of the DI of the ADIP, and determines the number of the recording layers of the inserted optical disc on the basis of the read "BD structure" and determines the optimal read power of the light beam irradiated on each of the recording layers (step S118).

Incidentally, the controller 20 reproduces data set in advance to be firstly reproduced, such as, for example, menu data, after the disc determination processing described above. Alternatively, the controller 20 records data designated by a user onto the optical disc.

The terms "1.0 mW", "0.35 mW", "0.7 mW", "ADIP address", "BD Layer Type Identifier", "BD structure", and "lens actuator 12" are one example of the "first power", the "second power", the "third power", the "layer information", the "layer type information", the "configuration information", and the "lens driving device" of the present invention, respectively. Moreover, the "controller 20" of the present invention is one example of the "power setting device", the "controlling device", the "number-of-layers detecting device", the "number-of-layers specifying device", and the "type specifying device".

A part associated with the reproduction out of the information recording/reproducing apparatus 1 described above is one example of the "information reproducing apparatus" of the present invention.

COMPARATIVE EXAMPLE

Figure 6:
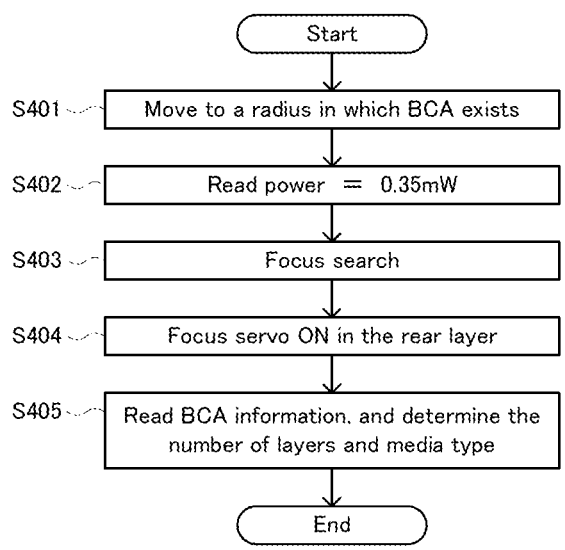
FIG. 6 is a flowchart illustrating disc determination processing in a comparative example of the present invention.

Next, a comparative example of the information recording/reproducing apparatus in the first embodiment will be explained with reference to FIG. 6. FIG. 6 is a flowchart illustrating disc determination processing in the comparative example.

In FIG. 6, firstly, the controller 20 controls the lens actuator 12 such that the light beam emitted from the light source LD is focused on a radius (typically, in an innermost circumferential portion) in which a burst cutting area (BCA) of the optical disc exists (step S401).

Then, the controller 20 controls the light source LD to emit the light beam having power of 0.35 mW (step S402). Then, the controller 20 performs the focus search while controlling the lens actuator 12 (step S403).

If a plurality of recording layers are detected in the focus search, the controller 20 performs the focus servo in the recording layer located on the rear side viewed from the cover layer side of the optical disc (step S404). Incidentally, if only one recording layer is detected in the focus servo, the controller 20 performs the focus servo in the detected layer.

Then, the controller 20 reads the BCA recorded on the optical disc, determines the number of the recording layers provided for the optical disc and a media type on the basis of the read BCA (step S405), and ends the processing.

On the information recording/reproducing apparatus in the comparative example, after the disc determination processing described above, the spindle motor 30 is controller to stop the rotation of the optical disc once. After that, again, the spindle motor 30 is controlled to rotate the optical disc at the predetermined number of revolutions. The lens actuator 12 is also controlled such that the light beam emitted from the light source LD is focused on a predetermined radial position of the optical disc.

Thus, on the information recording/reproducing apparatus in the comparative example, a time from when the optical disc is inserted to the information recording/reproducing apparatus to a time point at which the information recording is started on the optical disc or at which the reproduction of the recorded information is started becomes longer in comparison with the information recording/reproducing apparatus in the first embodiment described above.

MODIFIED EXAMPLE

Figure 4:
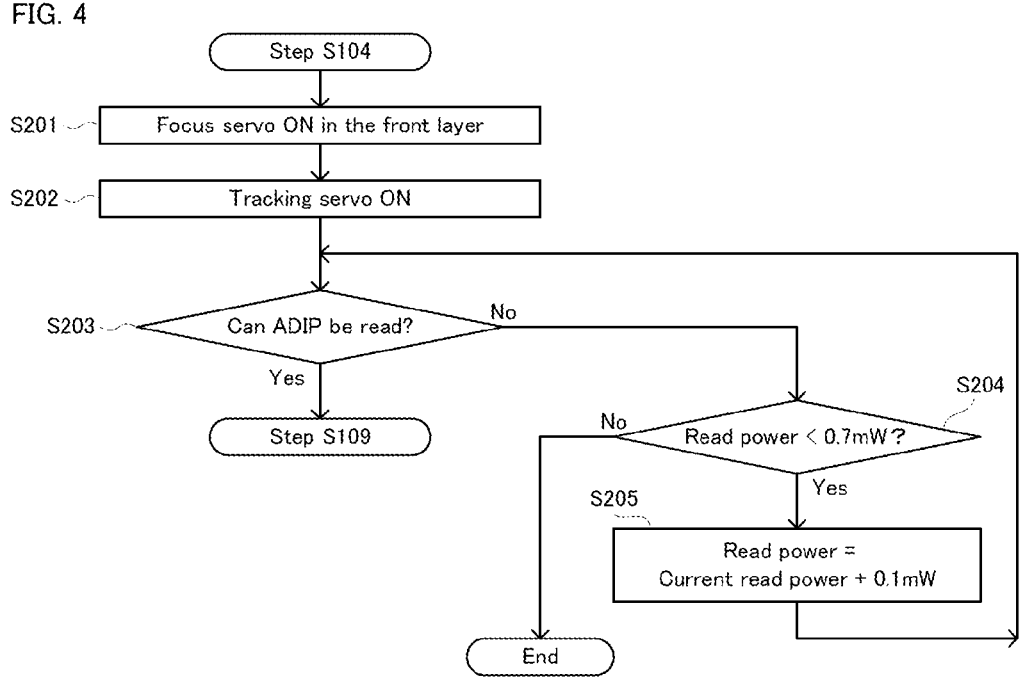
FIG. 4 is a flowchart illustrating disc determination processing in a modified example of the first embodiment of the present invention.

Next, a modified example of the information recording/reproducing apparatus in the first embodiment will be explained with reference to FIG. 4. FIG. 4 is a flowchart illustrating disc determination processing in the modified example of the first embodiment.

In FIG. 4, the controller 20 performs the focus servo (step S201) and performs the tracking servo (step S202) in the recording layer located on the front or nearest side viewed from the cover layer side of the inserted optical disc, on the basis of the signal outputted from the photodetector PD, after the processing of the step S104 described above (refer to FIG. 3). Incidentally, the power of the light beam irradiated on the optical disc is, for example, 0.35 mW.

Then, the controller 20 judges whether or not the ADIP can be read (step S203). If it is judged that the ADIP cannot be read (the step S203: No), the controller 20 judges whether or not the power of the light beam irradiated on the optical disc is less than 0.7 mW (step S204).

If it is judged that the power of the light beam irradiated on the optical disc is greater than or equal to 0.7 mW (the step S204: No), the controller 20 ends the processing. On the other hand, if it is judged that the power of the light beam irradiated on the optical disc is less than 0.7 mW (the step S204: Yes), the controller 20 controls the light source LD to make the power of the light beam irradiated on the optical disc 0.1 mW higher than the current power (step S205), and performs the processing in the step S203 described above.

In the processing in the step S203 described above, if it is judged that the ADIP can be read (the step S203: Yes), the controller 20 performs the step S109 described above (refer to FIG. 3).

<Second Embodiment>

A second embodiment of the information recording/reproducing apparatus of the present invention will be explained with reference to FIG. 5. The second embodiment has the same configuration as that of the first embodiment, except that the disc determination processing is partially different.

Thus, in the second embodiment, an explanation overlapping with that of the first embodiment will be omitted, and common parts on the drawing will carry the same reference numerals. Basically, only different points will be explained with reference to FIG. 5. FIG. 5 is a flowchart illustrating disc determination processing in the second embodiment, having the same concept as that of FIG. 3.

Figure 5:
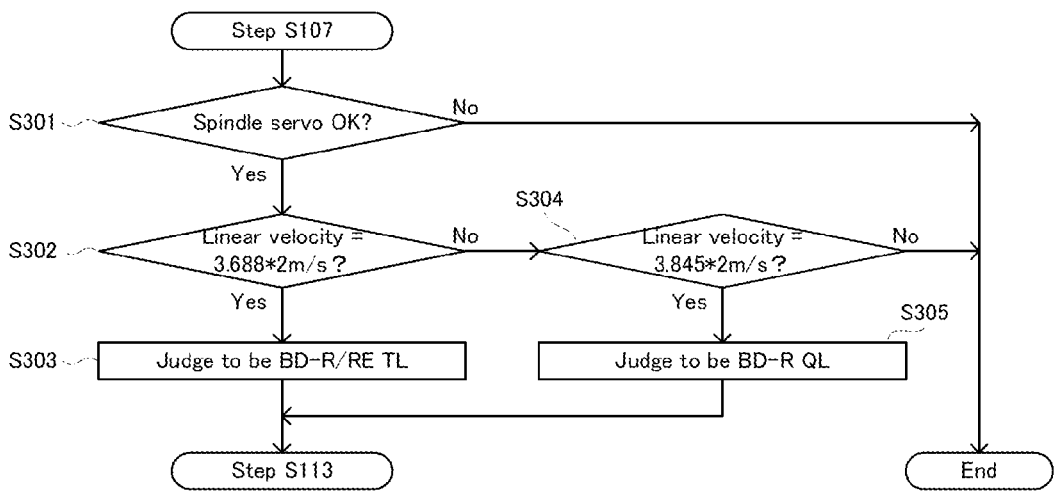
FIG. 5 is a flowchart illustrating disc determination processing in a second embodiment of the present invention.

In FIG. 5, the controller 20 judges, after the processing in the step S107 described above (refer to FIG. 3), whether or not frequency of a wobble signal associated with the recording layer located on the front side viewed from the cover layer side of the inserted optical disc is predetermined frequency (i.e. whether or not spindle servo is performed) (step S301).

If it is judged that the spindle servo is not performed (the step S301: No), the controller 20 ends the processing. On the other hand, if it is judged that the spindle servo is performed (the step S301: Yes), the controller 20 judges whether or not a linear velocity is 3.688*2 m/s (step S302).

Here, "*2" in the linear velocity indicates a double of 1-time speed (3.688 m/s herein) which is a reference value. In other words, the judgment or determination of the linear velocity is performed using 2-times speed.

If it is judged that the linear velocity is 3.688*2 m/s (the step S302: Yes), the controller 20 judges that the inserted optical disc is the triple-layer BD-R or BD-RE having three recording layers (step S303) and performs the processing in the step S113 described above (refer to FIG. 3).

On the other hand, if it is judged that the linear velocity is not 3.688*2 m/s (the step S302: No), the controller 20 judges whether or not the linear velocity is 3.845*2 m/s (step S304).

If it is judged that the linear velocity is 3.845*2 m/s (the step S304: Yes), the controller 20 judges that the inserted optical disc is the quadruple-layer BD-R having four recording layers (step S305) and performs the processing in the step S113 described above (refer to FIG. 3). On the other hand, if it is judged that the linear velocity is not 3.845*2 m/s (the step S304: No), the controller 20 ends the processing.

The present invention is not limited to the aforementioned embodiments, but various changes may be made, if desired, without departing from the essence or spirit of the invention which can be read from the claims and the entire specification. An information recording/reproducing method and apparatus, which involve such changes, are also intended to be within the technical scope of the present invention.

Specifically, for example, the present invention can be also applied to a read-only optical disc, such as a Blu-ray Disc Read Only Memory (BD-ROM). In this case, the "layer information" and the "layer type information" of the present invention may be obtained from a radio frequency (RF) signal generated in accordance with the signal outputted from the photodetector PD.

Description Of Reference Codes

1 information recording/reproducing apparatus
2 Blu-ray disc
10 optical pickup
11 objective lens
12 lens actuator
20 controller
21 recording layer
30 spindle motor
LD light source
PD photodetector

The invention claimed is:

1. An information recording/reproducing method in an information recording/reproducing apparatus for recording information onto an optical disc or reproducing the recorded information by focusing a light beam emitted from a light source on the optical disc via an objective lens, the optical disc having a plurality of recording layers, layer type information indicating a type of each of the recording layers being recorded in advance in the each recording layer, said information recording/reproducing method comprising:

a number-of-layer detecting process of setting power of the light beam emitted from the light source, to second power, which is weaker than first power as one power, and detecting the number of the recording layers provided for the optical disc;

a lens controlling process of controlling the objective lens to focus the light beam emitted from the light source on one recording layer which is the closest to the objective lens out of the plurality of recording layers, in a condition that the detected number of the recording layers is greater than or equal to three;

a power setting process of setting the power of the light beam emitted from the light source to third power, which is between the first power and the second power, after said lens controlling process;

a number-of-layer specifying process of specifying the number of the recording layers provided for the optical disc on the basis of layer information, which is information associated with the one recording layer; and a type specifying process of setting the power of the light beam emitted from the light source to the first power after said number-of-layer specifying process, reading the layer type information recorded in advance in the one recording layer, and specifying a type of the optical disc on the basis of the read layer type information.

2. The information recording/reproducing method according to claim 1, wherein the layer information is address information associated with the one recording layer.

3. The information recording/reproducing method according to claim 2, further comprising a judging process of judging whether or not the layer information can be read by using the light beam having the second power after said lens controlling process and before said number-of-layer specifying process, if it is judged that the layer information can be read, said number-of-layer specifying process being performed, and if it is judged that the layer information cannot be read, said number-of-layer specifying process being performed after said power setting process.

4. The information recording/reproducing method according to claim 1, wherein the layer information is a linear velocity in which frequency of a wobble signal associated with the one recording layer is predetermined frequency.

5. The information recording/reproducing method according to claim 1, wherein configuration information indicating a configuration of the optical disc is recorded in advance on the optical disc, and said information recording/reproducing method further comprises a determining process of reading the configuration information after said type specifying process, determining the number of the recording layers on the basis of the read configuration information, and determining the power of the light beam to irradiate on each of the plurality of recording layers.

6. An information recording/reproducing apparatus for recording information onto an optical disc or reproducing the recorded information, the optical disc having a plurality of recording layers, layer type information indicating a type of each of the recording layers being recorded in advance in the each recording layer, said information recording/reproducing apparatus comprising:

a light source;

a power setting device capable of setting power of a light beam emitted from the light source;

an objective lens for focusing the light beam emitted from the light source on the optical disc;

a lens driving device capable of driving the objective lens such that the light beam emitted from the light source is focused on a recording layer which is a recording or reproduction target out of the plurality of recording layers;

a controlling device for controlling each of said power setting device and said lens driving device; and a number-of-layer detecting device for detecting the number of the recording layers provided for the optical disc, said controlling device controlling said power setting device to set the power of the light beam emitted from the light source to second power, which is weaker than first power as one power, when said number-of-layer detecting device detects the number of the recording layers, controlling said lens driving device such that the light beam emitted from the light source is focused on one recording layer which is the closest to the objective lens out of the plurality of recording layers, in a condition that the number of the recording layers detected by said number-of-layer detecting device is greater than or equal to three, and controlling said power setting device to set the power of the light beam emitted from the light source to third power, which is between the first power and the second power, after the light beam emitted from the light source is focused on the one recording layer, said information recording/reproducing apparatus further comprising:

a number-of-layer specifying device for specifying the number of the recording layers provided for the optical disc on the basis of layer information, which is information associated with the one recording layer; and a type specifying device for reading the layer type information recorded in advance in the one recording layer and specifying a type of the optical disc on the basis of the read layer type information, said controlling device controlling said power setting device to set the power of the light beam emitted from the light source to the first power when said type specifying device specifies the type.

7. An information reproducing apparatus for reproducing information recorded on an optical disc having a plurality of recording layers, layer type information indicating a type of each of the recording layers being recorded in advance in the each recording layer, said information reproducing apparatus comprising:

a light source;

a power setting device capable of setting power of a light beam emitted from the light source;

an objective lens for focusing the light beam emitted from the light source on the optical disc;

a lens driving device capable of driving the objective lens such that the light beam emitted from the light source is focused on a recording layer which is a reproduction target out of the plurality of recording layers;

a controlling device for controlling each of said power setting device and said lens driving device; and a number-of-layer detecting device for detecting the number of the recording layers provided for the optical disc, said controlling device controlling said power setting device to set the power of the light beam emitted from the light source to second power, which is weaker than first power as one power, when said number-of-layer detecting device detects the number of the recording layers, controlling said lens driving device such that the light beam emitted from the light source is focused on one recording layer which is the closest to the objective lens out of the plurality of recording layers, in a condition that the number of the recording layers detected by said number-of-layer detecting device is greater than or equal to three, and controlling said power setting device to set the power of the light beam emitted from the light source to third power, which is between the first power and the second power, after the light beam emitted from the light source is focused on the one recording layer, said information reproducing apparatus further comprising:

a number-of-layer specifying device for specifying the number of the recording layers provided for the optical disc on the basis of layer information, which is information associated with the one recording layer; and a type specifying device for reading the layer type information recorded in advance in the one recording layer and specifying a type of the optical disc on the basis of the read layer type information, said controlling device controlling said power setting device to set the power of the light beam emitted from the light source to the first power when said type specifying device specifies the type.

* * * * *